May 29, 1934.  R. N. SAXBY ET AL  1,960,798
TOTALIZATOR TICKET ISSUING MACHINE
Filed Oct. 8, 1931   13 Sheets-Sheet 1
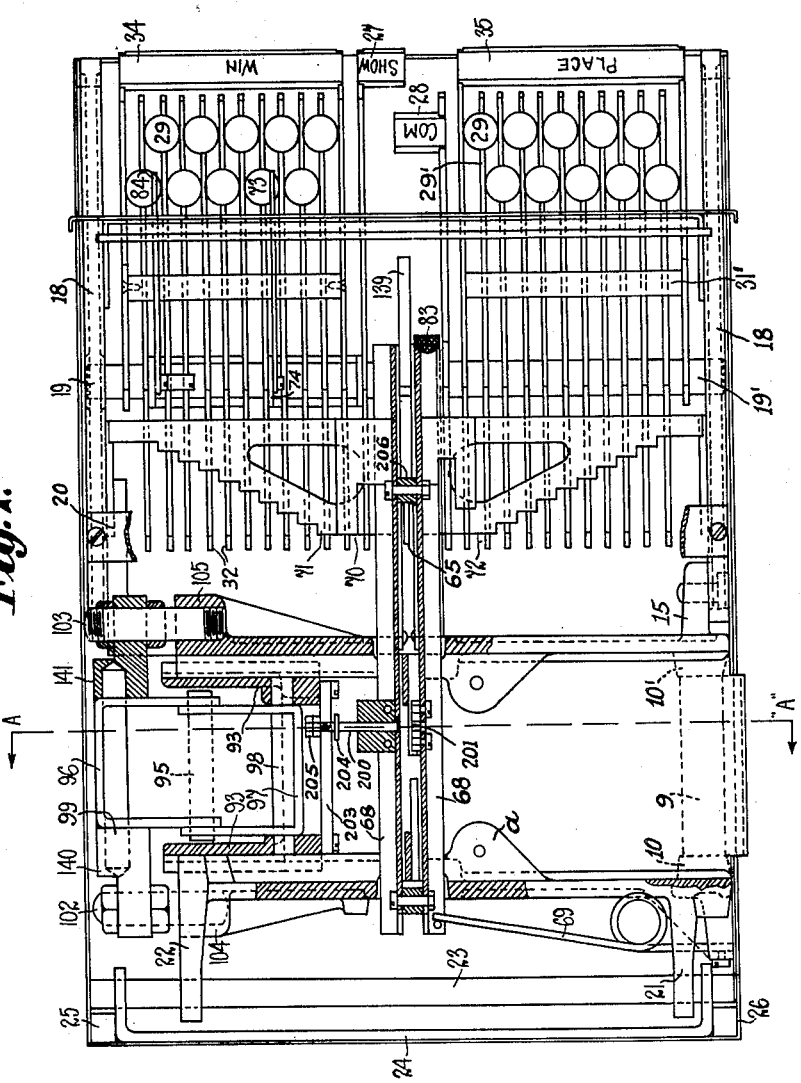

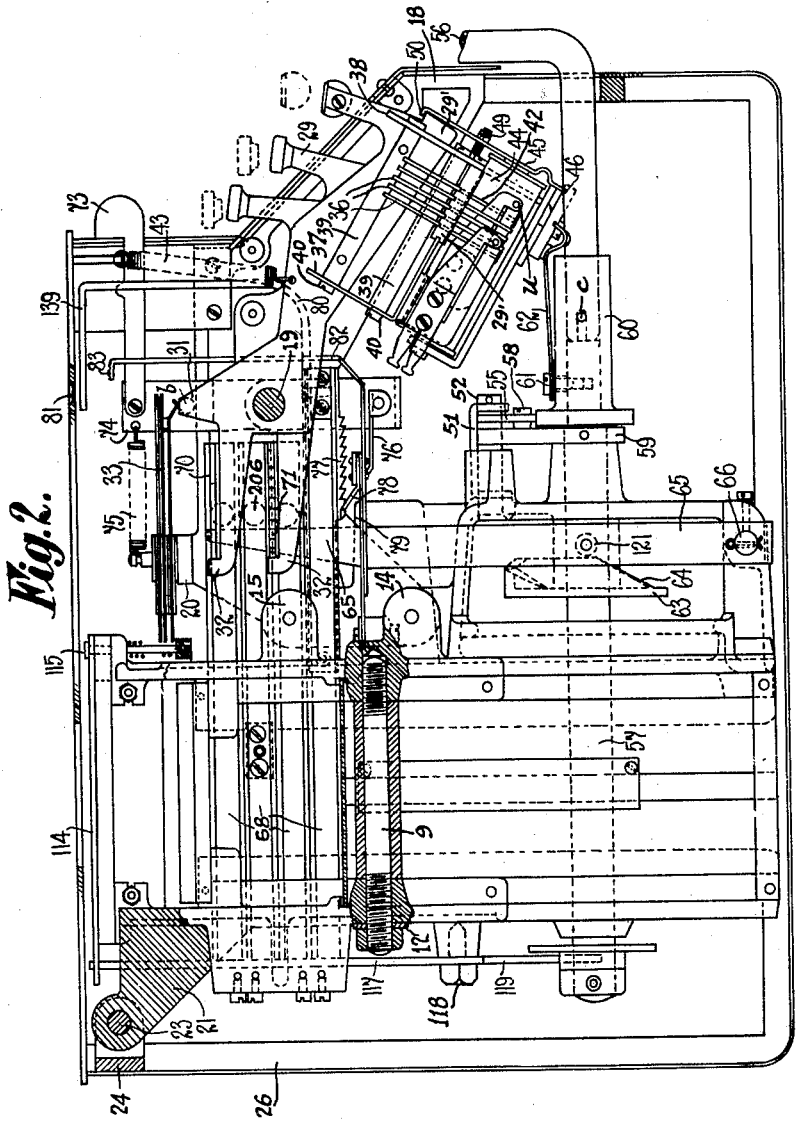

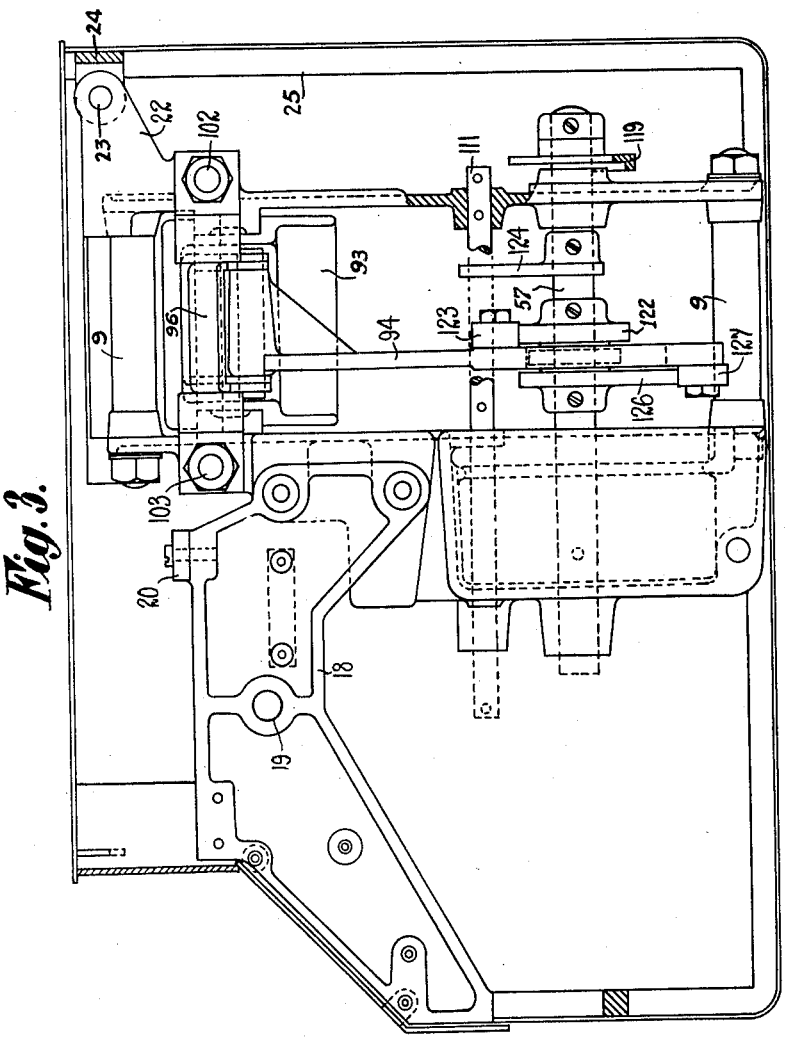

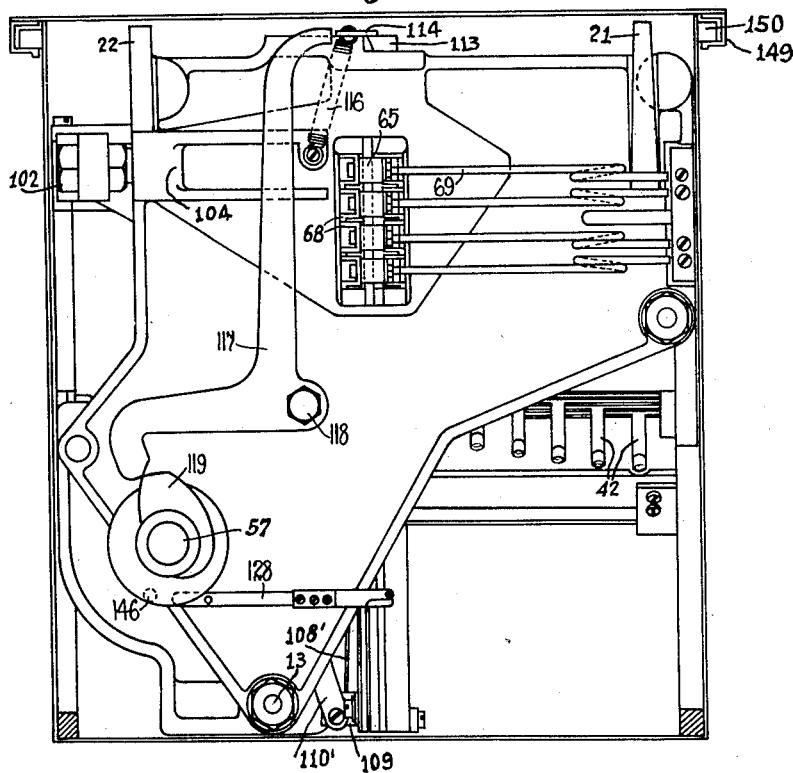

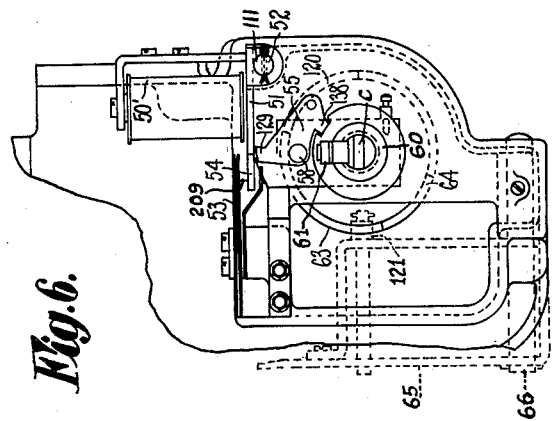
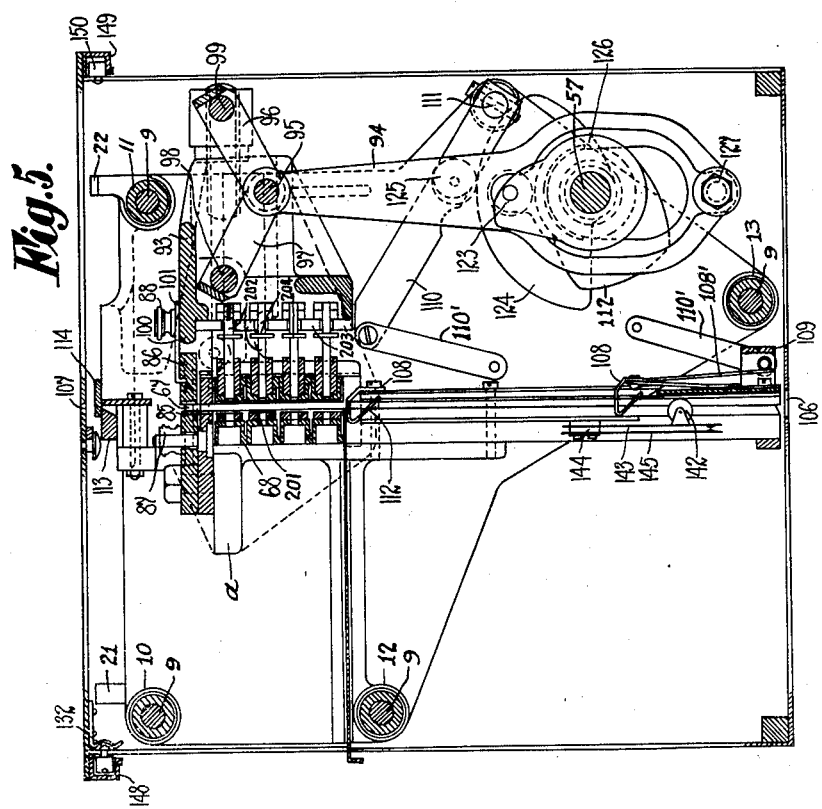

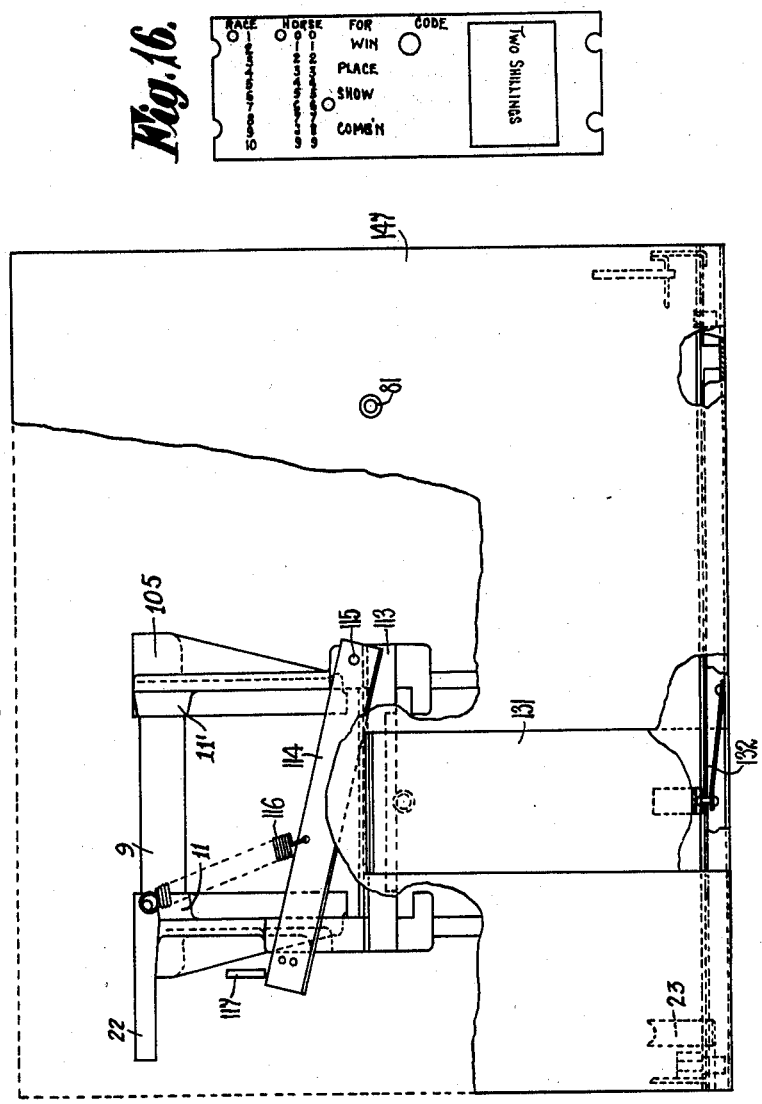

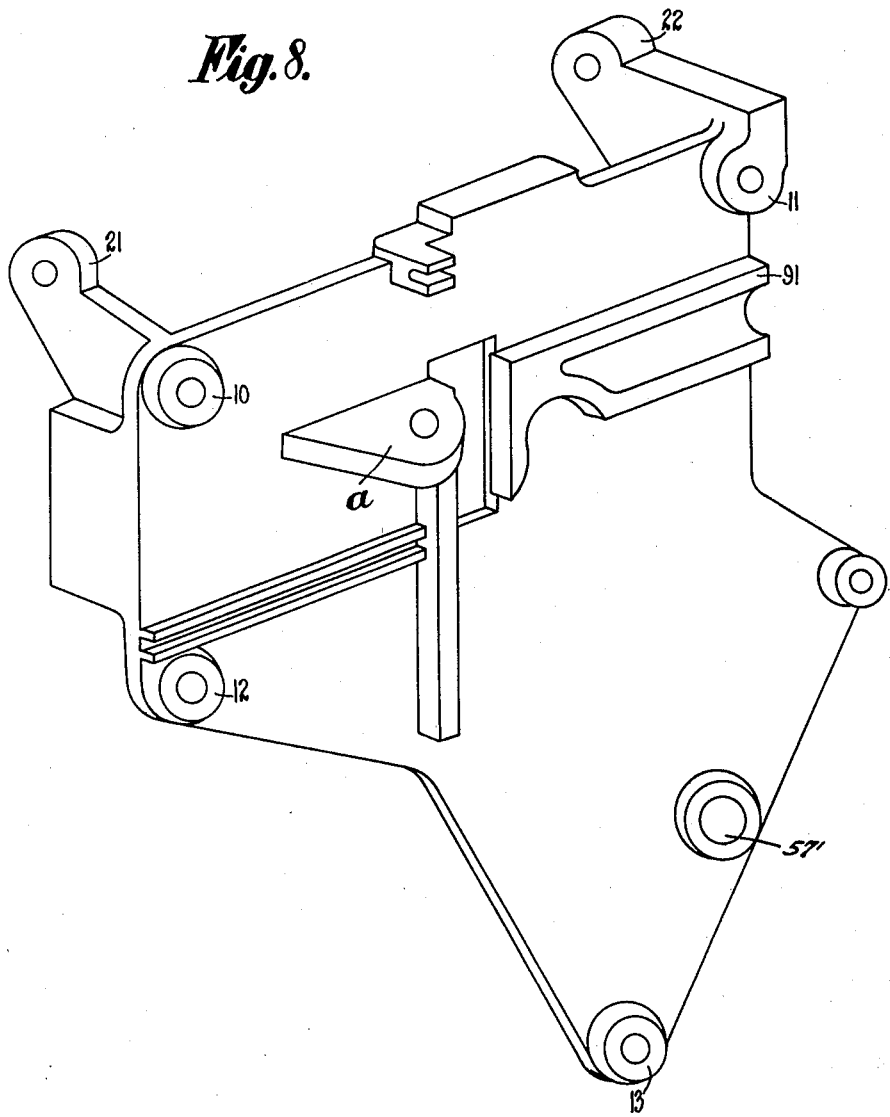

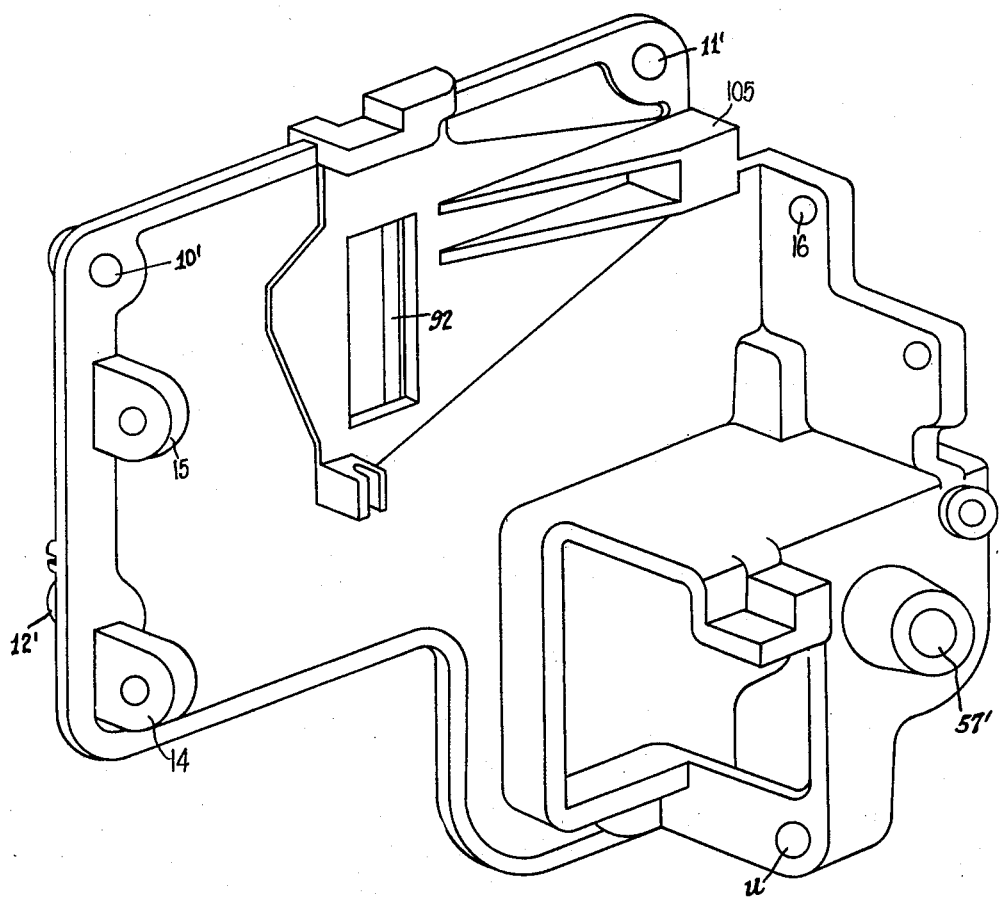

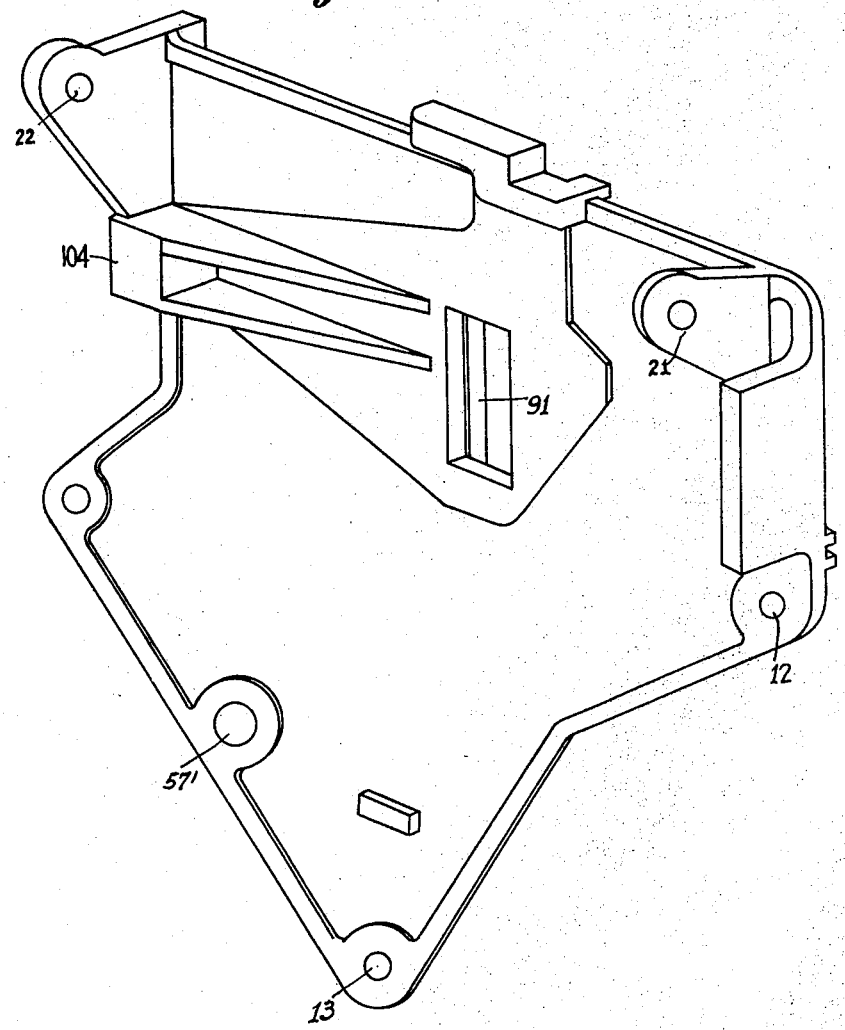

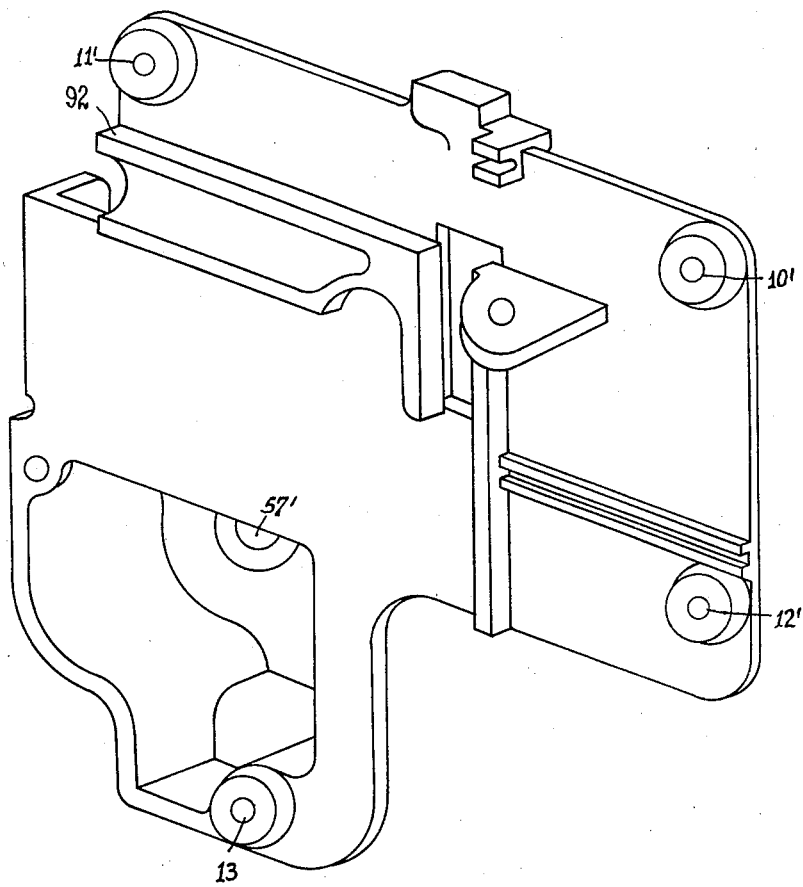

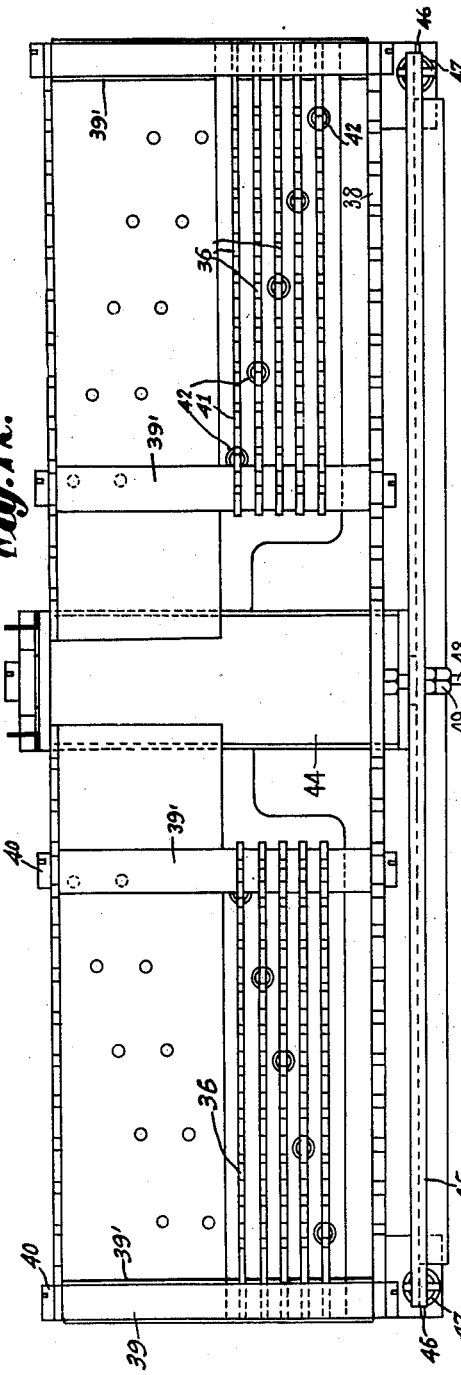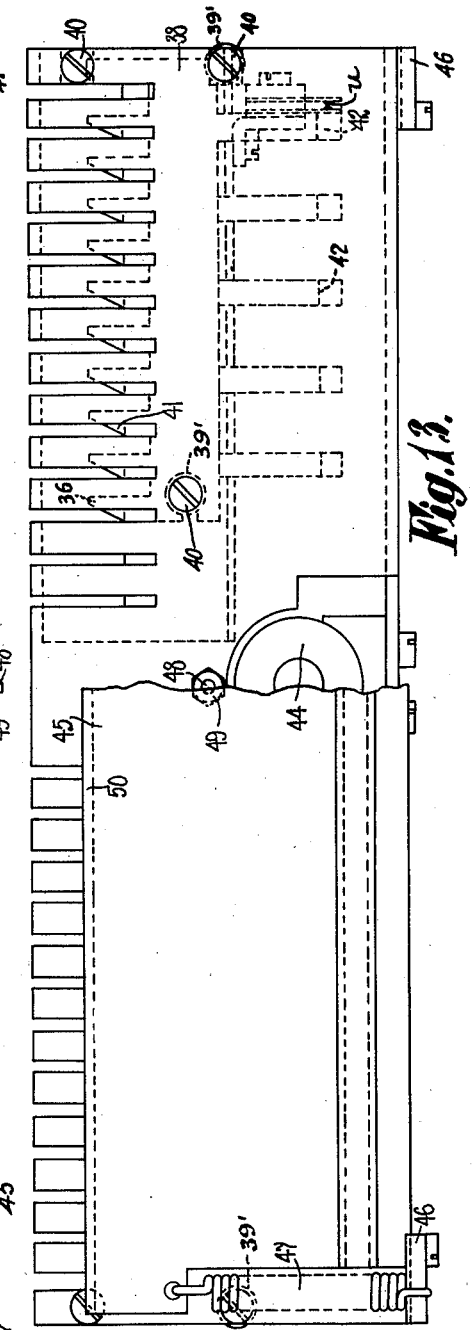

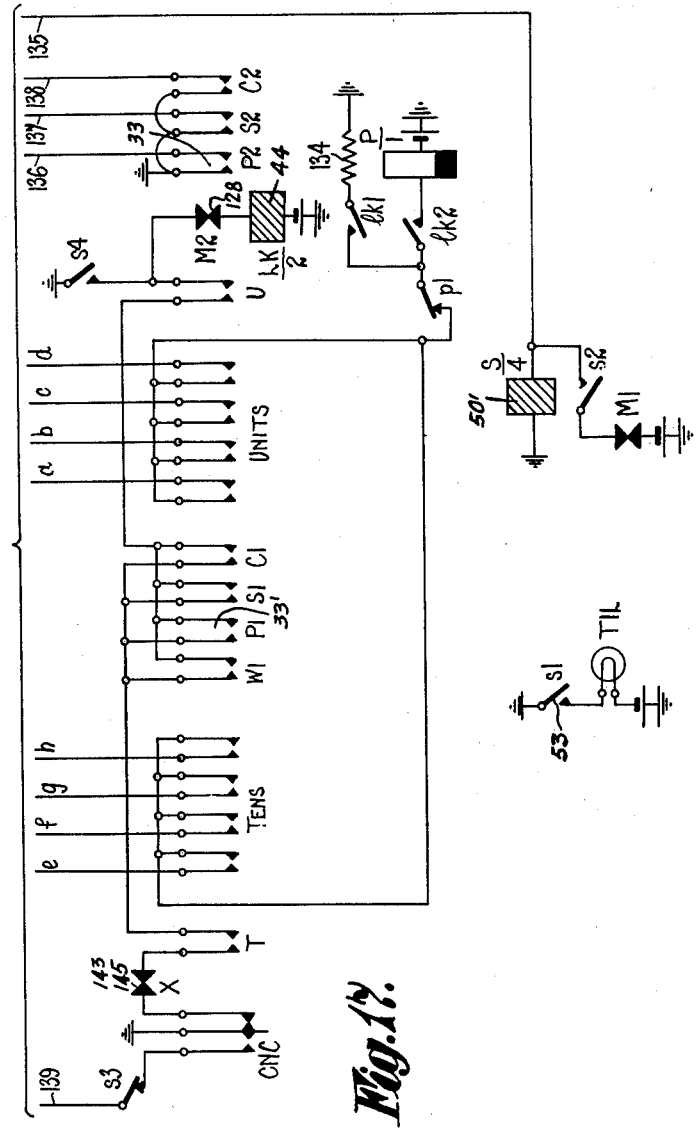

Patented May 29, 1934

1,960,798

UNITED STATES PATENT OFFICE 1,960,798

TOTALIZATOR TICKET ISSUING MACHINE

Robert Norman Saxby and Sidney Reynell Smith, Liverpool, England, assignors to Automatic Electric Company Limited, Liverpool, England Application October 8, 1931, Serial No. 567,720 In Great Britain October 11, 1930

6 Claims. (Cl. 164—112)

The present invention relates to ticket-issuing machines for use with electric totalizators of the type used on race courses and may be considered as a development of the machine described in British Patent Specification No. 343,034.

The object of the present invention is to provide a cheap and compact ticket-issuing machine in which individual operations are reduced to a minimum and wherever possible the various pieces of mechanism comprising the machine are used in common by all keys.

One feature of the invention relates to arrangements whereby the keys which are operated to effect the registration of a bet co-operate with common bars extending the length of the key strip to effect the actual registration of the bet in the totalizing equipment and with further common bars to effect the marking of the ticket with the appropriate information.

The invention will be better understood from the following description of one method of carrying it into effect which should be taken in conjunction with the accompanying drawings comprising Figs. 1 to 17.

Figure 14:
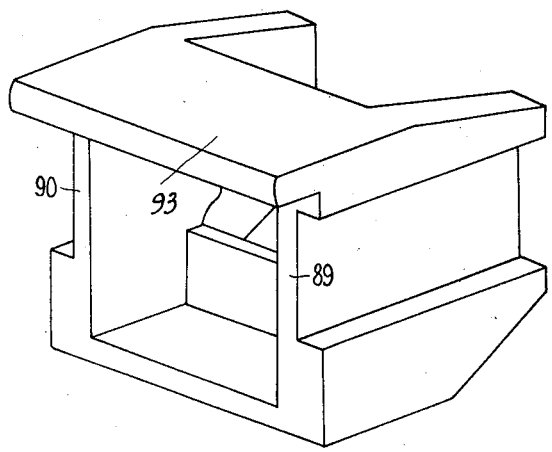
Figure 15:
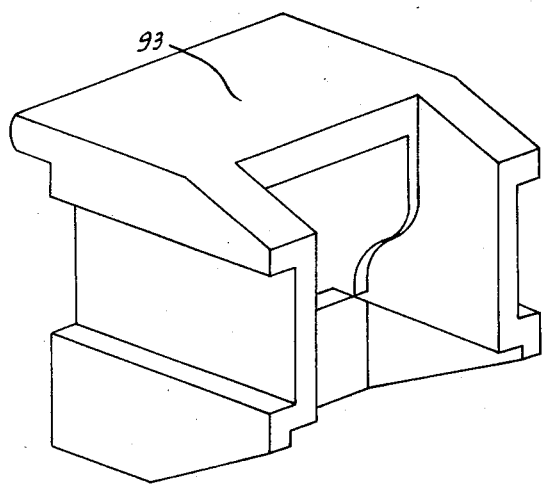

Fig. 1 of these drawings shows a plan view of the machine with the cover plate removed, Fig. 2 shows a left-hand side view of the machine with the containing box cut away to show the mechanism, Fig. 3 shows a right-hand side view of the machine framework assembly and the mounting of the cam shaft, Fig. 4 shows a rear view of the machine with the container cut away, Fig. 5 shows a cross section of the machine on the line AA in Fig. 1, Fig. 6 is a fragmentary view showing the means whereby the issuing handle is electro-mechanically clutched to the cam shaft, Fig. 7 shows a plan view of the cutter mechanism which was omitted from Fig. 1 to avoid complicating the drawings, Figs. 8 and 9 show respectively front perspective views of the rear and front framework castings of the machine which are assembled parallel to each other by means of pillars extending through the bossed holes, Figs. 10 and 11 show similar rear perspective views of the framework castings, Figs. 12 and 13 show respectively a plan and elevation of the key chamber, Figs. 14 and 15 show two perspective views of the punch block casting which is slideably mounted between the framework castings, Fig. 16 illustrates a typical ticket and Fig. 17 shows the electrical connections of the machine.

The tickets employed are preferably of the preprinted type shown in Fig. 16 bearing the fixed and all the variable information it is desired to make use of, and the selection of the particular race number, the number of the runner and the class of bet, whether for a win, place, show or combination is made by punching holes in the ticket adjacent to the particular information required. The tickets form a continuous roll or strip which is conveniently accommodated outside the machine proper.

It will be seen from reference to the various figures that the components comprising the machine are housed in a substantially rectangular metal box and are mounted on two cast metal framework members of the shape clearly shown in the perspective views Figs. 8–11. These two castings are arranged to support the punching and embossing mechanism and are assembled parallel to each other and connected together by shouldered spacing rods 9 which pass through the holes 10, 11, 12 and 13 and 10', 11', and 12' and are bolted at their ends by means of nuts. Secured to the lugs 14 and 15 and similar holes on the other side one of which is shown at 16, Fig. 9, are brackets of the shape shown in Fig. 3 designated 18 which are bridged by a flat bar 20 and a pivot rod 19 upon which the key set is supported. Thus it will be seen that the frame consists essentially of two substantially vertical cast members which are mounted parallel to each other and extending forward from the sides of the front casting are brackets upon which is supported the key set. The casting shown in Fig. 8 which forms the rear of the machine is provided at each side with substantial lugs 21 and 22 which are drilled to accommodate a rod 23 supported across the containing box which forms a hinge about which the framework may be turned so that the whole of the components comprising the machine may be raised bodily for inspection purposes. The supporting lugs 21 and 22 and pivot rod 23 may be identified in Fig. 1 and it will be seen that the rod is supported between the arms of an elongated U-shaped bracket 24 secured to the square section pillars 25 and 26 comprising the inner framework of the containing box.

The runner keys 29 are arranged in two groups of ten keys each those situated to the left corresponding to the tens digit of the number, and those situated to the right corresponding to the units digit, from which keys a maximum of 99 different registrations may be obtained. The keys are arranged in staggered formation after the fashion of those of a typewriter, while the "win" and "place" keys are provided in the form of long bars designated 34 and 35 running the length of the key strip in a similar manner to the spacing bar on a typewriter so that they may be operated conveniently whatever the position of the particular runner keys depressed. Between the two sets of runner keys are additional class keys designated 27 and 28 corresponding to "show" and "combination." These latter class keys will only be provided on machines intended for use in circumstances where such betting is carried on and it may be explained that under these circumstances place will correspond to the first and second horses, show will correspond to either first, second or third horses while combination will correspond to all three horses.

The keys such as 29 are of the shape indicated in Fig. 2 conveniently stamped out of metal plate and are pivoted on the rod 19 as previously described. The class keys are provided with an extended arm 31 (Fig. 2) of the shape shown while all keys are provided with the extension 32. The arm 31 is terminated in an insulated buffer b arranged to operate the electrical spring set 33 which transmits a signal to the totalizing equipment corresponding to the class of bet being made, while the arm 32 is provided with a turned up end arranged to come into the path of a plate 70 or 71 controlling the position of a slideably mounted punch and punch block casting 93 by means of which the ticket is marked in a manner which will be more fully described later. The key shown in Fig. 2 with the operating arm 31 corresponds to the place key which comprises two key members, one at each side of the tens group which are connected together by a flat operating bar in the manner shown in Fig. 1 designated 31'.

The runner keys which may be distinguished by the round operating buttons are all similar in shape and pivoted to the same rod 19, the intervening space between adjacent keys being filled by spacing washers 19' which are threaded over the rod alternately with the key levers. As will be more fully described later in connection with the circuit arrangements the runner keys are arranged to set up a code over eight code leads which are divided into two groups, four for the tens keys and four for the units keys. In order that the spring sets which effect the application of potential to these leads may be used in common by all keys of a common group, such as the units key group, the key levers are located above common bars 36 of comb-like form arranged parallel to each other and provided with obliquely cut teeth 41 in the manner indicated in Figs. 12 and 13. Two groups of bars 36 are provided, one for the units keys and the other for the tens keys. The bars 36 are mounted on rollers 39' at each end so that upon the depression of a key the key lever 29' will plunge between the teeth on the bars 36 and by contacting with the obliquely cut portion 41 will cause one or more of said bars to be displaced in a longitudinal direction for the purpose of operating the common spring sets previously referred to. The assembly comprises two slotted plates 37 and 38 arranged parallel to each other and connected together by means of the shouldered spacing rods such as 39 and the screws 40. One pair of slots is provided for each key lever and although the levers have not been shown in the figure it must be understood that they are always in engagement with the slots which serve to guide their movement. They are normally located immediately above the obliquely cut teeth 41 on the comb plates 36 shown in Fig. 13. The comb plates 36 which are five in number in each group are supported at each end on rollers 39' mounted on the spacing rods 39 and are each provided with a downwardly extending arm such as 42 which serves to operate the corresponding spring sets such as the tens and units springs shown in Fig. 17. Four of the bars in each group are used for coding while the fifth bar is operated by all keys of this group to close a common set of springs, such as U shown in Fig. 13 for the units group or T shown in Fig. 17 for the tens group included in the key locking circuit. The tens group of bars 36, shown to the left of Figs. 12 and 13, are similar to the units group, which is shown to the right, and also have arms 42 for operating the springs T (not shown) and the tens set of springs shown in Fig. 17. The teeth 41 on the respective bars where provided are set in line with each other and also with the key levers to which they correspond and are so arranged that each key pressed will effect the displacement of a different combination of one or more of the four coding bars 36 to produce the required operation of the tens and unit spring sets partially shown in Fig. 2 for marking on the code leads shown in Fig. 17. The class keys which are not required to effect coding are mounted clear of the comb plates 36 and the appropriate signal produced by their depression is made by an extension 31 on the key lever operating the individual spring sets such as 33 previously referred to.

The depression of each key is made against the tension of a helical spring such as 43 shown in Fig. 2, and in order that the keys pressed may be locking in their operated positions until the signal they are intended to produce is satisfactorily received and also that the depression of further keys shall be prevented during this period, an electro-mechanical locking device is incorporated in the key chamber which acts on all keys at the same time. This arrangement comprises the electro magnet 44 shown in Figs. 2, 12 and 13 which controls the movement of a plate 45 having a knife edge which is pivoted in grooves in blocks 46 more clearly shown in the side elevation Fig. 2 and held in normal position by means of the springs 47 which are provided one at each end of the plate. In Fig. 13 the plate has been cut away on the right-hand side to show more clearly the functioning of the comb plates 36, but it will be understood that it extends for the full length of the key chamber and is adjusted as regards its stroke by means of the threaded pillar 48 which passes through an elongated hole in the plate and carries at its outer end the locking nuts 49. The upper edge of the plate is turned over at the point 50 in the manner shown in Fig. 2 and is arranged to co-operate with an extension 29' provided on the operating levers of all keys of both runner and class types. The functioning of the arrangement is such that when the selection of the runner and the class of bet has been made, the depression of the three keys will close a series circuit for the magnet 44 which on operation moves the pivoted plate 45 into engagement with the extension 29' on the keys. In Fig. 2 the keys are shown in their operated positions and locked thus by the turned-over end of the plate 45 in the manner shown. As regards all other keys which are in the normal position as indicated in dotted outline, it will be appreciated that the turned-over end 50 of the pivoted plate 45 will take up a position immediately below the operating levers so as to prevent their depression at this time.

Reviewing the operation so far described, it will be remembered that the runner is selected by the depression of the appropriate tens and units keys and the class of bet determined by the depression of a still further key in response to which signals are transmitted to the totalizing equipment to bring about the proper registration. When such registration has been satisfactorily completed, the totalizing equipment will return a signal over a special wire which brings about the energization of the issuing magnet 50' shown in Fig. 6 which is mounted on the extruded portion of the casting shown more clearly in Fig. 9. The magnet 50' is provided with an armature 51 pivoted at the point 52. An insulated bushing 209 is arranged to operate electrical contact springs 53 which complete a lighting circuit for a lamp TIL (Fig. 17) but situated in view of the ticket machine operator to inform him that the ticket may now be issued to the purchaser. In addition the armature 51 is provided with an extended portion 54 engaging with a spring-loaded catch 55 which serves the purpose of clutching the issuing handle 56 shown extending from the front of the machine in Fig. 2 to a shaft 57 supported on suitable bearings let into the face of the cast frame members and carrying a battery of cams which serve to perform the mechanical functions in the correct sequence necessary for issuing a ticket to the purchaser. The catch 55 is pivoted at the point 58 to a substantial plate 59 which is pinned to the shaft carrying the cams. Loosely supported on an extension of the shaft is a collar 60 more clearly shown in Fig. 2 which is captive thereto by means of a set screw 61 threaded through the collar so that it enters a groove on the shaft and serves to also hold in position a flat spring 62. The cranked handle 56, of which only part is shown in the drawings, is of round section and provided with a forked end engaging with a pin c passing transversely through the collar. The flat spring 62 which it will be seen is provided with a rounded end registers with a groove on the handle thereby retaining the latter in position in the collar. When the issuing magnet 50' is energized, the spring-loaded catch 55 will move forward into the position shown in the drawings and an extension thereon registers with a notch 138 cut in the flange of the collar 60 thereby coupling it to the shaft carrying the cams so that subsequently when the handle is rotated in a clockwise direction the cam shaft 57 will be operated. Normally however, the catch 55 is held out of engagement with the collar 60 by the armature 54 and the handle may then be rotated without effect. Upon the first movement of the cam shaft 57, the cup-shaped cam 63 shown in Figs. 2 and 6 is first to function, and this cam is provided with a steep retiring face 64 which enables the lever 65, which is pivoted at the point 66, to move to the left. The free end of this lever is arranged to hold the slidably mounted punches 200 in their normal position and these will now move under spring pressure to take up positions corresponding to the keys depressed in a manner which will now be described.

Referring to the section view, Fig. 5, it will be seen that four sets of punches 200 are provided surmounted by an embossing die 67 all of which are operated in a single movement of the slidably mounted punching block 93. The punches 200 and dies 201 are mounted on members of channel section such as 68 which are arranged to slide one upon the other under the control of hair pin springs 69 shown more clearly in the rear view Fig. 4. Each pair of channel members 68 carry respectively on one side a die 201 and on the other side a punch 200 and are coupled together so that they move as a single unit. This arrangement is important in that the die and punch will always be correctly centred one with the other, and the trouble of locating a movable punch with respect to a fixed die comprising a number of holes is thereby obviated.

The upper punch 200 in Fig. 5, which corresponds to the class of bet, is set by the depression of one of the class keys designated win, place, show and combination, and for this purpose a flat plate of special shape designated 70 in Fig. 1 is secured to the end of the sliding channel members and is cut in steps of different depth so that it may register with the turned up ends 32 of the class keys which control the extent of its movement.

The second and third punches corresponding to the units and tens digits of the runner number are similarly controlled as to their position by means of the stepped plates 71 and 72 respectively which ensure that a different movement of the punches will result according to which of the keys are depressed.

The fourth punch which corresponds to the race number is arranged to be set by hand and for this purpose a finger pull 73 is provided extending from the front of the machine as shown in Fig. 2. The finger pull 73 is connected by means of a screw to the bar 74 which is pivoted on the rod 19 and anchored to the frame by means of the helical spring 75. Pivoted to the lower end of the bar 74 is a pawl 76 arranged to engage by means of spring pressure with the teeth of a rack 77 secured to the underside of the channel member 68 controlling the movement of the lower punch. It will be seen therefore that for each operation of the finger pull 73 the lower channel member 68 will be advanced one tooth so as to set the punch opposite the required race number on the ticket. This movement is made against the pressure of the hair pin spring 69 mounted at the rear of the machine and accordingly the bar 74 is arranged to be held in position after each operation by the detent 78 which is rivetted to a flat spring 79 secured to the frame. It should be explained that the ratchet teeth are sufficiently wide to enable the pawl and the detent to engage the same tooth side by side. In order to provide an indication to the machine operator as to the race number for which the machine is set, an extended bracket 80 is secured to the channel member so that it will take the same movement, and is provided along its upper arm 139 with a series of numbers conveniently 1 to 10 corresponding to those on the ticket, which are arranged to show one after the other through an inspection port 81 provided in the cover plate of the machine more clearly shown in Fig. 7. In order to provide a means for restoring the punch to its normal position at any time, usually after the full complement of races have been run, an extended bracket member 82 is rivetted to the flat spring controlling the holding detent 78 and let out to the top of the machine into the form of a finger press 83 which in order to prevent unauthorized use is accessible only when the top cover plate is removed. Fig. 1 clearly shows the finger press 83 which when operated removes the holding detent 78 from the ratchet teeth 77 and at the same time an extension on the detent 78 not shown tilts the pawl 76 also out of engagement with the ratchet teeth 77 so that the channel member 68 and punch 200 may then slide back to their normal position under the influence of the hair pin spring 69 previously referred to.

In addition to the race number finger pull 73, a further finger pull 84 for cancellation purposes is provided as shown more clearly in the plan view Fig. 1. This is connected to a pivot bar and when operated opens a pair of contact springs CNC which serve to release the locking magnet 44, controlling the runner and class keys already depressed so that their effect shall not be recorded on the main totalizing equipment. The cancel key 84 is effective at any time prior to the reception of the issuing signal from the main totalizing equipment which operates the magnet 50', after which its operation is without effect and this is desirable in that registration will then have been recorded on the main totalizing equipment and a corresponding ticket must therefore be issued to account for the sum registered.

The embossing dies 85 and 86 bearing the code word or sign which is secret until the commencement of the race are shown in the section view Fig. 5, and are arranged to be readily removable by undoing the knurled finger nuts 87 and 88 so that they may be changed from time to time at the discretion of the racecourse officials. Preferably the dies 85 and 86 will emboss to a depth sufficient to puncture the paper thereby rendering it difficult for the paper to be re-embossed for fraudulent purposes.

The punches 200 and the emboss dies 85 and 86 are actuated simultaneously from a slideably mounted punch block 93 of the shape shown in the perspective view Figs. 14 and 15. This block 93 is provided with grooves 89 and 90 arranged to register with a track 91 and 92 mounted on to the faces of the main frame castings in the manner shown in the detailed views Figs. 8 and 11. The punch block is shown in section in Fig. 5 designated 93 and is provided across its front face with five flat bars 203 of rectangular section between which the respective punches 200 are captive. It will be seen from the drawings that each punch 200 is provided with a shouldered flange 204 which comes up against one side of the bars 203 and is locked on the other side by a pair of locking nuts 205, sufficient clearance being allowed to enable the punches 200 to move in a path parallel to the bars 203 so as to take up their respective position. The punch block 93 is operated from a toggle arrangement shown more clearly in Fig. 5 comprising a connecting rod 94 which is moved substantially vertically from the cam shaft 57 in a manner which will be described later and is coupled at its upper end by means of the pin 95 to a pair of toggle arms 96 and 97 which are U-shaped as more clearly seen in Fig. 1. The arm 97 is coupled to the sliding punch block by means of the pin 98 and the arm 96 is coupled by means of the pin 99 to adjustable brackets 140 and 141 which are secured to the frame. By means of this arrangement the vertical movement of the connecting rod 94 is converted into a horizontal movement of the punch block 93 which forces the punches 200 and the embossing dies 85 and 86 into contact with the ticket to be marked. It may be explained that the embossing dies 85 and 86 are always correctly centred one with the other in that the movable part 86 is arranged to run on pins 67 extending from the fixed part 85 and is moved forward by contacting with the rounded face 100 of the punch block and withdrawn by means of a light bracket 101 held in position beneath the knurled nut 88. In order that the punch block 93 may be adjusted as regards its stroke, the bracket members supporting the toggle arm 96 and pivot pin 99 are adjustable, being adjustably mounted on pillars 102 and 103 (Fig. 1) which are threaded into abutments 104 and 105 cast in the frame member and of the shape more clearly shown in Figs. 9 and 10. The supporting brackets themselves designated 140 and 141 are held in position between adjustable nuts which are threaded to the pillars 102 and 103 and enable the position of the brackets to be altered. By adjusting the positions of the nuts on either side of the brackets 140 and 141 the stroke of the punch block 93 may be varied.

The pre-printed ticket roll which is mounted externally to the machine is fed through a slot 106 in the base of the machine shown in Fig. 5 and extends through a vertical guide channel so as to run between the punching mechanism and emerges from a slot 107 in the cover plate. In order that the machine shall be operable only so long as it contains the required ticket strip, the latter is arranged to bear against a roller 142 supported on a light spring 143 which is fixed to the frame at the point 144 and carries at its free end an electrical contact arranged to co-operate with another contact spring 145 mounted in the same assembly. Conveniently these contacts are included in the electrical circuit of the machine and are closed by the presence of the ticket strip.

At the conclusion of the punching operation, the paper is fed forward by means of a light spring finger 108 which has been shown in the drawings in two positions so as to indicate more clearly the extent of its movement. The finger is arranged to register with a round hole in the paper accurately placed in relation to the printing and is carried by a carriage member 109 running in a suitable channel and coupled to lever 110' and the articulated lever 110 which is pivoted to the rod 111 extending between suitable bushes formed in the casting more clearly shown in the side view Fig. 3. This same rod supports also the armature of the issuing magnet 50' and at its opposite side a helical spring not shown which is coupled to the articulated arm 110 is tensioned so as to force the arm into its lower position. The arm 110 is controlled by a cam 124 of suitable shape on the cam shaft 57 and is arranged to be released from its upper to its lower position at a time when the paper is firmly held in position by the pressure of the punches and embossing die, and as the spring finger 108 is of light construction and the ticket paper comparatively substantial, the finger will be withdrawn from the hole by the inclined portion 112 bearing on the edge of the hole thus producing a withdrawing action. The finger 108 then rides down the paper contacting therewith through the rounded portion corresponding to the following ticket which is now in a condition to be raised in line with the punching mechanism, while the ticket which has just been punched will extend through a slot 107 in the top plate of the machine. In this position the punched ticket will be in line with the cutter blade 113 which although shown in its closed position in the drawings will have been previously opened in a manner which will be described.

It will be seen from Fig. 7 that the cutter comprises a fixed plate 113 co-operating with a movable blade 114 which is pivoted to the frame by means of the spring-loaded pivot pin 115 shown more clearly in Fig. 2 and anchored to the frame by means of the restoring spring 116 best seen in Fig. 4. The free end of the blade contacts with the arm of a cranked lever 117 seen in Fig. 4 which is pivoted at the point 118 and co-operates with a cam 119 of suitable shape secured to the end of the main cam shaft, 57 which extends through the bearing in the casting in the manner shown in Fig. 3. The functioning of the cutter will be readily appreciated without further description.

The construction and function of the various parts involved in the issuing of a ticket having been dealt with separately, a description will now be given of their operation in progressive relationship due to a single clockwise rotation of the cam shaft 57. As already mentioned, the first to function is the cup-shaped cam designated 63 located at the right-hand end of the shaft 57 shown in Fig. 2 and housed inside the box-shaped portion of the casting. This cam is also shown in front elevation in Fig. 6 and is provided with a steep retiring face 64 and a less steeply inclined rising face 120, (Fig. 6) and upon its movement the roller 121 attached to the lever 65 in Fig. 2 will run down the face 64 so that the lever 65 may tilt to the left away from the rollers 206 supported between the sides of the punch carriages 68 and consequently the latter will now move under spring pressure to the rear of the machine until they are arrested in the manner previously described in accordance with the runner keys and class keys which are operated. Simultaneously with this operation the cutter cam 119 attached, to the left hand end of the shaft and clearly shown in Figs. 2 and 4 will move away from the lever 117 so that the cutter plates are then opened in readiness for the clipping operation. The next cam to function is the toggle operating cam 122 shown more clearly in Fig. 5 which engages with the roller 123 attached to the connecting rod 94 which is thereupon lifted to cause the punch block 93 to force the punches 200 and embossing die 86 into engagement with the ticket. At this time the paper strip will be securely transfixed by the operation of the punching mechanism and therefore the large cam 124 controlling the paper feed may be permitted to recede from the roller 125 attached to the spring loaded articulated arm 110. The roller 125 will therefore run down the face of the cam 124 to permit the carriage 109 and spring finger 108 to retire to lowest position and engage with the round hole in the ticket strip corresponding to the next ticket to be issued. By this time the roller 123 will fall over the end of the cam 122 and at the same instant the toggle restoring cam 126 will engage with another roller 127 also fastened to the connecting rod 94 so as to positively withdraw the punches from the paper.

When the punches are quite clear of the paper, the feed cam 124 will engage with the roller 125 which is lifted to cause the paper strip to be fed forward a distance equivalent to one ticket, so that which has just been punched will protrude through the slot 107 in the cover plate of the machine. Simultaneously with this operation the roller 121 will encounter the gradual rising portion of the cup-shaped cam 63 so that the lever 65 shown in Fig. 2 is tilted to the right to restore the punch carriages 68 to their normal positions.

At the conclusion of the vertical feed operation of the paper strip the cam 119 shown in Fig. 4 will become effective to tilt the lever 117 which produces a scissor like action on the part of the cutter blade 114 to sever the ticket which has been punched from the ticket strip so that it then falls over on to the cover plate of the machine within easy reach of the purchaser.

In this manner by one complete revolution of the handle 56 the ticket is punched, severed and issued to the purchaser. After approximately two thirds of the cycle is completed, a set of springs 128 shown more clearly in the Fig. 4 is operated from a buffer 146 attached to a flange on the cam shaft. These springs are arranged to open the holding circuit for the key locking magnet 44 and the issuing magnet 50' so that the keys depressed will be released, and the armature 51 of the issuing magnet will fall away to extinguish the lamp signal and prepare for the disconnection of the handle from the cam shaft at the completion of the issuing cycle.

When the issuing cycle is completed the extension 129 (Fig. 6) of the spring-loaded catch 55 will come up against a projection of the armature which causes the catch to be lifted against the tension of the spring 130 so as to de-clutch the cam shaft 57 from the handle 56 which then becomes quite free and may be rotated in either direction without effect on the mechanism.

In case the speed at which the ticket machine is to be operated is likely to be extremely rapid, the handle may be replaced by a small electric motor which will produce the required motive power with equal advantage and little change to the machine since its use is contemplated and space has been provided.

In order to facilitate the record work of the clerical staff employed it is arranged for two similar ticket strips to be fed through the machine at the same instant so that the punching is made through two thicknesses of paper. One strip is cut off and issued to the purchaser in the manner already described, while the other is diverted before reaching the cutters so that it issues from the left side of the machine and is stacked in zig-zag form in flat magazines immediately below.

For permitting the guiding of the record and the ticket strips into their proper directions when fitting new strips into the machine, a small portion of the lid designated 131 in Fig. 7 is removable separately from the main lid and is held in position by a spring catch 132. This arrangement also enables the ticket machine operator to sever the record strip in the receptacle corresponding to the last race from that about to be issued for the ensuing race and also permits the reading of the serial number of the next ticket to be issued from the machine. The lid or cover plate of the machine 147 shown in Fig. 7 comprises a rectangular metal plate provided along its longer edges with lengths of channel section duralumin 148 and 149 shown in Fig. 5 similar to that used in the construction of the punch carriages. The underside of the channel section is cut away at two points on either side sufficiently to permit the passage of four studs such as 150 which are riveted to the containing box so that the cover may be fitted by dropping it over the studs and sliding it towards the rear of the machine until it comes to rest against stops which are provided. In this position the studs will enter the channel section and conveniently a spring lock is incorporated at the rear of the machine to hold the cover against the stops so that it is now locked in position.

In case the machine is to be used on courses where the runners will never exceed 9 in number, as for example in dog racing, only the keys to the left of the machine need be fitted, while the place and win keys will be provided in the form of single keys located in the centre of the machine. The key designated O may under these circumstances be replaced by one marked T corresponding to "test", as a result of the depression of which a test ticket only will be issued and registration is not effected on the main totalizing equipment. In the case of the machine illustrated which caters for as many as 99 runners, the test ticket in this instance will be obtained by the depression of the keys marked O in both the tens and units groups. As the circuit arrangements are such that the two groups of keys are interdependent and the lead corresponding to O in the units group is unwired, it will be appreciated that registration will not be made on the main totalizing equipment.

In the case of the smaller machine for 9 runners where the use of coding springs operated by common bars does not offer such an economic advantage it is contemplated that an individual spring set and line will be provided per runner key.

A description will now be given of the electrical operations involved when a ticket-issuing machine of the type described is taken into use and for this purpose reference should be had to the circuit arrangements shown in Fig. 17. From this figure the common coding springs associated with each group will be recognized as designated tens and units while an additional two sets of springs which are operated when any one key in the two groups is depressed have been designated T and U respectively. The spring sets associated with the class keys, win, place, show and combination have been designated W, P, S and C respectively.

It is important for the successful operation of the machine and also to guard against fraudulent marking of the ticket, that a key in both the tens and units groups shall be depressed for each issuing operation so that in the case of runners bearing only a units number the 0 key of the tens group will be pressed in addition to the units key and consequently the issued ticket will be marked as 01 to 09 depending upon the selection made.

Considering now the detailed circuit operations, upon the depression of any tens and units keys the common spring sets T and U will be operated, while upon the operation of the win, place, show or combination keys one of the spring sets designated W, P, S or C will be operated. Under these circumstances a series circuit may be traced from earth by way of the resting springs of the cancel key CNC, springs X, which are held closed so long as there is a strip of paper in the machine, operated springs T, operated springs W1, P1, S1, or C1, whichever may be operated, operated springs U, resting springs 128 which are held closed until the issuing operation is two-thirds completed, key locking magnet LK (magnet 44) to battery.

As already explained the action of the locking magnet 44 holds operated the keys depressed and at armature 1k1 extends earth by way of a resistance 134 and by way of another operated armature 1k2 to energize a slow-to-operate relay P which may be conveniently mounted on the framework of the machine. Moreover during the operating time of relay P the resistance earth is extended by way of the resting armature p1 and the operated contacts of the tens and units coding springs to the code leads designated a, b, c, d, e, f, g and h in the required combination and these extend to decoding relay groups of the type disclosed in British patent specification previously referred to which serve to register the bet on a particular runner in the main totalizing equipment. The function of relay P is to insure that earth will always be maintained on the coding leads for a definite period.

No further circuit operations will take place in the ticket-issuing machine until the reception of the ticket-issuing impulse from the totalizing equipment when the bet has been duly registered, and this is represented by the connection of battery to the lead designated 135 thereby operating the issuing magnet S (magnet 50') which locks by way of its armature s2 in a circuit controlled by the mechanical contact M1 (128'). The issuing magnet moreover at armature s1 completes a circuit for lighting the ticket-issuing lamp TIL situated in view of the operator and also mechanically clutches the issuing handle to the driving mechanism of the ticket machine in the manner already described.

Upon the operation of the issuing handle, the ticket is punched and issued to the purchaser, and when approximately two-thirds of the issuing operation is completed, the mechanical springs M1 (128') and M2 (128) are operated to open the circuit of the issuing magnet S (50') and locking magnet LK (44) which thereupon release to restore the keys depressed and prepare for the de-clutching of the handle at the end of the issuing operation. It should also be mentioned that the operation of the place, show and combination springs designated P2, S2 and C2 extends earth over one of three leads designated 136, 137 and 138 so as to effect the change-over necessary in the main totalizing equipment to ensure that the bet is recorded in the correct pool. No such circuit is completed by the win key however since the totalizing equipment is normally set for the reception of win bets.

The operation of the cancel key CNC extends earth by way of resting armature s3 to the conductor 139 extending to the main totalizing equipment and serves to restore the registering mechanism which has been set up and at the same time breaks the holding circuit for the key locking magnet 44 so that the keys depressed are restored. Such operation is however only effective prior to the reception of the issuing signal from the main totalizing equipment since the issuing magnet S (50') is provided with armatures s3 and s4 which render the use of the cancel key ineffective at this stage.

What we claim as new and desire to secure by Letters Patent is:

1. In a ticket-issuing machine, for a ticket having preprinted data thereon arranged in columns, the first of said printed data columns containing printed numerals arranged in numerical order, the second of said printed data columns containing other printed numerals arranged in numerical order, the third of said printed data columns containing printed data relating to different classes, a first punch, a second punch, and a class punch for perforating said ticket, means manually operated for selectively setting said first punch in a position to perforate said ticket in the first data column corresponding to the numeral selected, means manually operated to selectively prepare the second punch to be set in a position to perforate said ticket in the second data column corresponding to the said other selected numeral, means manually operated to selectively prepare the class punch to be set in a position to perforate said ticket in the class data column in accordance with the selected class, and means for setting said second and class punches in the selected prepared positions and for thereafter operating all said punches to perforate said ticket in the data columns corresponding to the first numeral selected, the said other numeral selected, and the class selected.

2. In a ticket-issuing machine, for a ticket having preprinted data thereon arranged in columns, the first of said printed data columns containing printed numerals, the second of said printed data columns containing other printed numerals, the third printed column containing printed data designating different classes, a first punch, a second punch, and a class punch, a first key, means responsive to a selective operation of said first key for selectively setting said first punch in a position to perforate said ticket in the first data column in a position corresponding to the numeral selected, a plurality of keys each having a different numeral thereon, means responsive to the operation of a selected one of said plurality of keys for preparing the second punch to be set in a position to perforate said ticket in the second data column in a position corresponding to the said other selected numeral, class keys designating different classes, means responsive to the operation of a selected one of said class keys for preparing the class punch to be set in a position to perforate said ticket in the class data column in a position corresponding to the class selected, a manually operable handle, and means responsive to the operation of said handle for first setting said second and class punches in the positions selected and for thereafter operating all said punches to perforate said ticket in the data columns corresponding to the first numeral selected, the said other numeral selected, and the class selected.

3. In a ticket-issuing machine, a plurality of groups of control keys, a punch for each group of keys, a set of springs for each group of keys, means for operating said spring sets only in response to the operation of a key in each of said groups, a magnet, means for operating said magnet only in case said spring sets and keys are operated, a second magnet, means operated in response to the operation of said first magnet for operating the second magnet, operating mechanism for controlling the perforating operation of said punches, a rotatable handle normally disconnected from said operating mechanism, clutch mechanism operated in response to the operation of said second magnet for operatively connecting said operating mechanism to said rotatable handle, and means thereafter responsive to the rotation of said handle for operating said operating mechanism to cause said punches to perforate a ticket corresponding to the keys actuated.

4. In a ticket-issuing machine, a plurality of groups of keys, a marking member common to each group of keys, a plurality of bars common to each group of keys, means responsive to the operation of any key in a group for setting said marking member common to the group containing the operated key in a distinctive position corresponding to the actuated key and for operating one or more of the associated common bars dependent upon the key actuated, circuits normally ineffective for operating purposes, and means controlled by the operation of a key in each group and the operation of said bars for closing said circuits for operating purposes.

5. In a ticket-issuing machine, a group of keys, a punch for said group of keys, a movable carriage carrying said punch, a lever for each key, a projection on each lever, a stepped bar carried by said carriage, means responsive to the operation of a key for placing said projection in the path of said stepped bar, means including a spring for moving said carriage and punch until said stepped bar engages said projection, and means for thereafter operating said punch to perforate a ticket in accordance with the position the punch and carriage is stopped in by said projection and stepped bar.

6. In a ticket issuing machine, a plurality of groups of control keys, a punch for each group of keys, said punches normally inoperative, means for preparing said punches for operation, and a plurality of control devices each common to one group of keys and operated only when a key in the associated group is operated for operating said means, and means for thereafter operating said punches to perforate a ticket in accordance with the operated key in each group.

ROBERT NORMAN SAXBY.
SIDNEY REYNELL SMITH.